Feb. 18, 1941.　　　G. T. DOWNEY　　　2,232,597
VALVE ASSEMBLY
Filed July 13, 1939　　　2 Sheets-Sheet 1
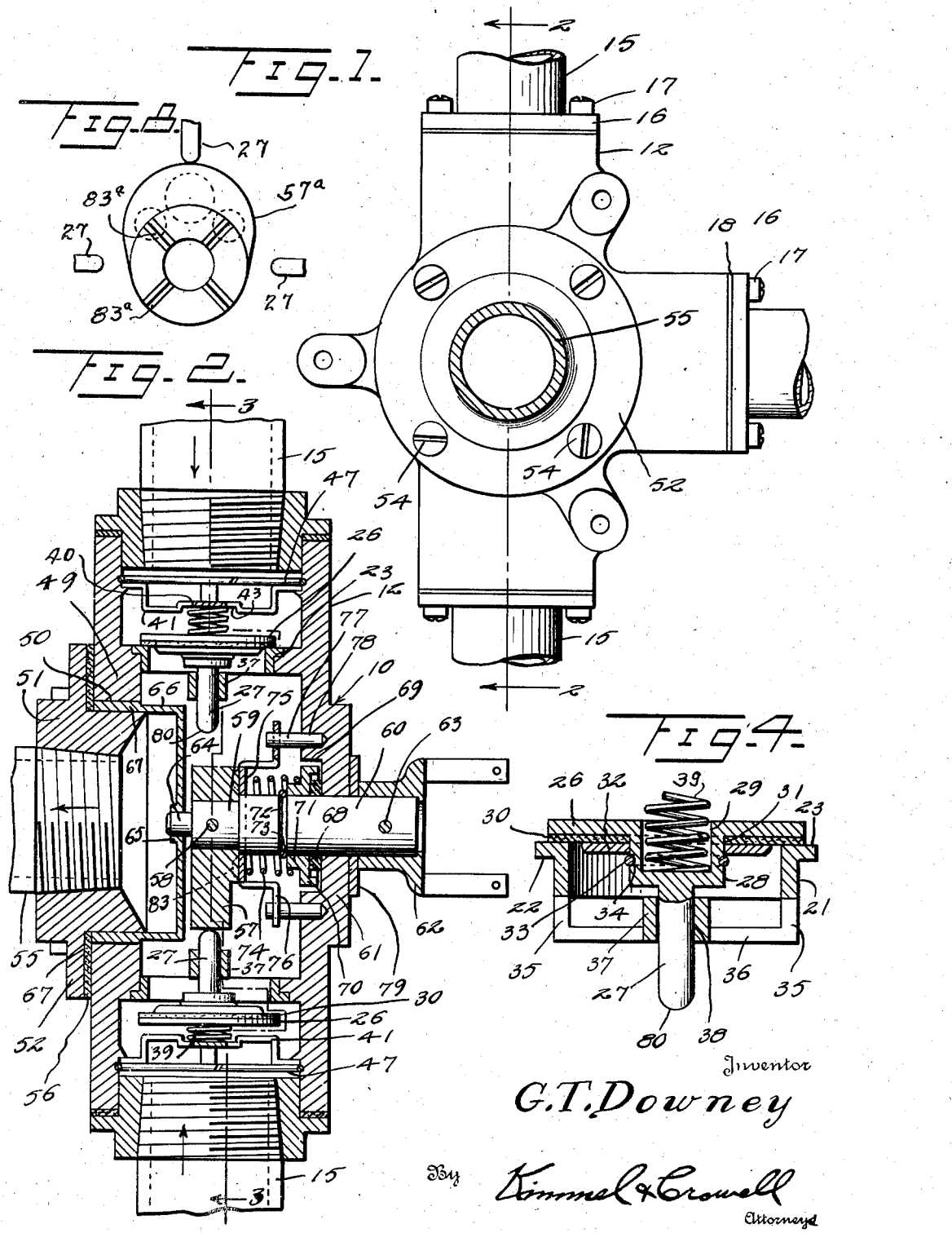
Inventor
G. T. Downey
By Kimmel & Crowell
Attorneys Feb. 18, 1941.   G. T. DOWNEY   2,232,597
VALVE ASSEMBLY
Filed July 13, 1939   2 Sheets-Sheet 2
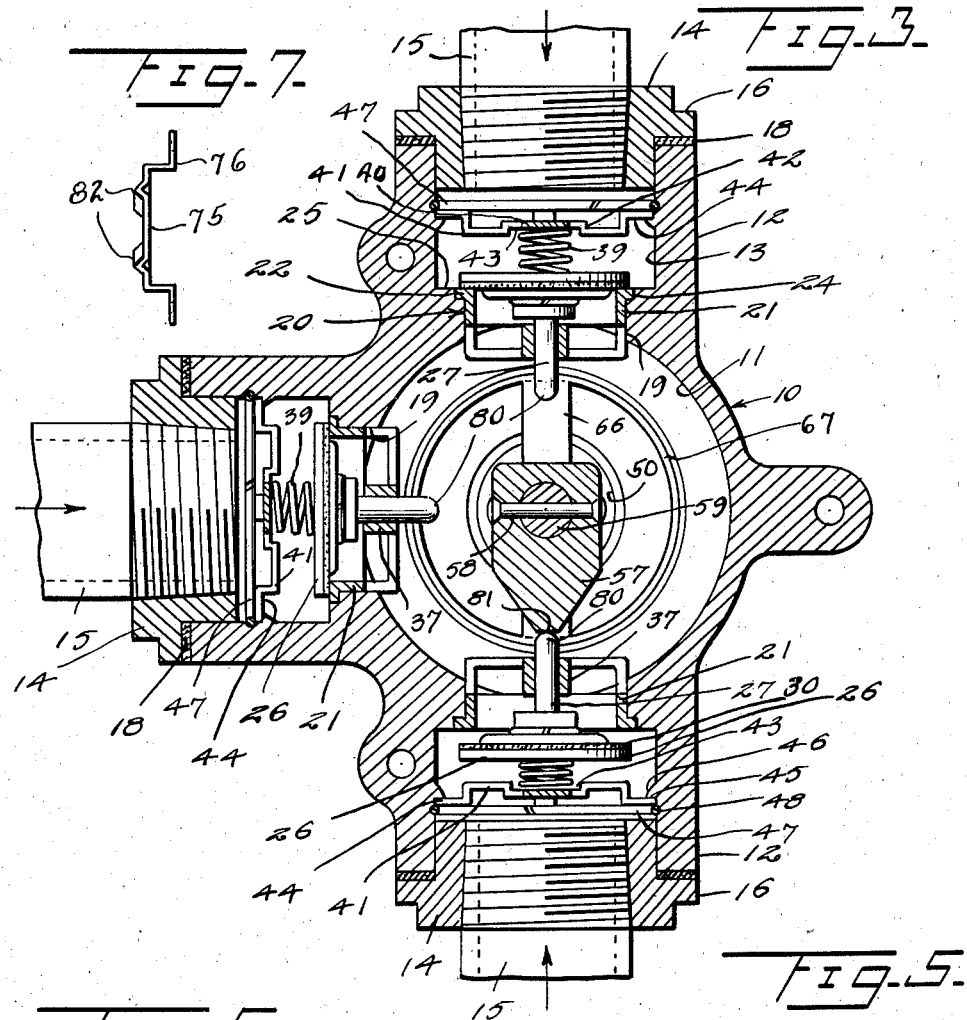
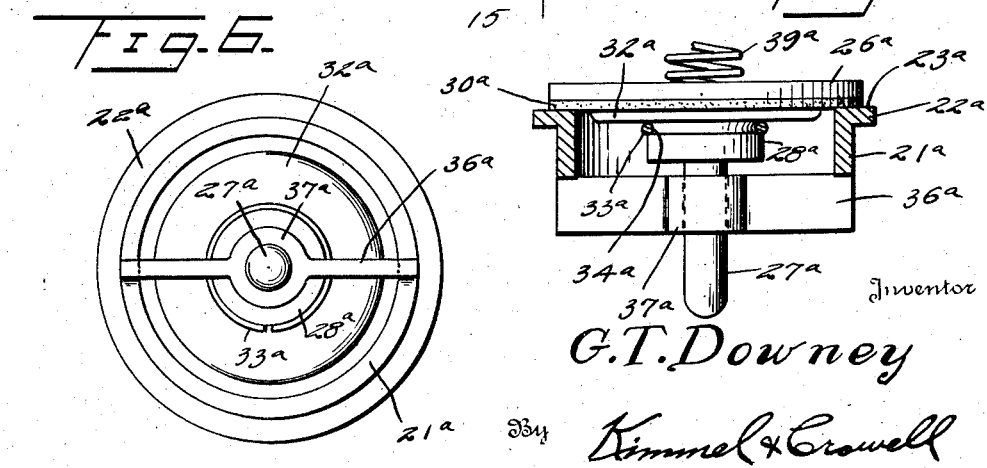
Inventor
G. T. Downey
By Kimmel & Crowell
Attorneys Patented Feb. 18, 1941

2,232,597

UNITED STATES PATENT OFFICE 2,232,597

VALVE ASSEMBLY

George T. Downey, Corry, Pa., assignor to Aero Supply Manufacturing Co., Inc., Corry, Pa.

Application July 13, 1939, Serial No. 284,313

1 Claim. (Cl. 277—20)

This invention relates to valve structures and is an improvement over the structure embodied in Patent No. 2,159,845 which issued May 23, 1939, Patent No. 2,164,232 which issued June 27, 1939 and my co-pending application, Serial No. 247,909 filed December 27, 1938, now Patent No. 2,219,982 granted October 29, 1940.

An object of this invention is to provide a valve structure or assembly including an improved valve seat and guide means together with an improved means for maintaining the valve in an open position.

Another object of this invention is to provide a valve structure of this kind wherein the fluid may be communicated with a common discharge, the fluid being received from a selected intake pipe line connected to the valve structure and the valve structure including an improved assembly wherein the valve head may be readily removed for replacement when necessary.

A further object of this invention is to provide an improved valve structure of this kind wherein the fluid passing through the valve housing will not be subjected to any appreciable loss of pressure by reason of having to pass through a series of intersecting elements.

A still further object of this invention is to provide a valve structure of this kind wherein the valve seat and guide are removably mounted in the valve housing and may be constructed of material having a different character than the valve housing so that the valve seat will more readily resist wear and can be reground where necessary without injury to the valve housing and may be subsequently replaced by a new combined valve seat and valve guide when the original valve seat and guide have been worn or ground unduly A further object of this invention is to provide an improved valve member for use with a valve assembly of this kind including a valve head and an integral stem together with means for removably securing a sealing gasket on the valve head so that when the valve leaks the gasket can be readily replaced without making it necessary to send the entire valve structure back to the factory for readjustment or reseating of the valves.

A further object of this invention is to provide a valve structure of this kind which is particularly adapted for use in a gasoline feed line and is more especially adapted for use in a gasoline feed line or lines associated with an airplane engine so as to permit the connection of the engine with a selected source of fuel supply normally carried by the airplane.

A further object of this invention is to provide a valve structure or assembly which is more simple in construction than devices heretofore available so that the valve structure will not get out of order as easily as other structures of this kind and so that when repairs are necessary such repairs may be easily and quickly made.

Embodying the foregoing aims and to others which may directly or indirectly hereinafter appear, the invention consists of the novel construction, combination and arrangement of parts as will be more specifically referred to and illustrated in the accompanying drawings, wherein are shown embodiments of the invention, but it is to be understood that changes, variations and modifications may be resorted to which fall within the scope of the invention as claimed.

In the drawings:

Figure 1 is a detailed front elevation partly in section of a valve structure or assembly constructed according to an embodiment of this invention, Figure 2 is an enlarged sectional view taken on the line 2—2 of Figure 1, Figure 3 is a sectional view taken on the line 3—3 of Figure 2, Figure 4 is an enlarged sectional view taken longitudinally through one of the valve members associated with this device, Figure 5 is a sectional view partly in elevation of a modified form of valve member including a valve seat, Figure 6 is a bottom plan view of the structure shown in Figure 5, Figure 7 is a detail side elevation of the index plate, and Figure 8 is a detail side elevation of a modified form of cam with the associated valve stems broken away.

Referring to the drawings and first to Figures 1 to 4 inclusive, the numeral 10 designates generally a housing which is provided on the interior thereof with a fluid chamber 11. The housing 10 is provided with a plurality of radially arranged bosses 12 provided with a fluid passage 13 and each boss 12 has a bushing or coupling member 14 mounted in the outer end thereof to which a fluid supply line 15 is adapted to be connected. The coupling member 14 is provided with a flange 16 which is adapted to be secured as by bolts or screws 17 to the outer end of a boss 12 and a gasket 18 may be interposed between the flange 16 and the outer end of a boss 12 so as to seal the bushing 14 in the boss 12.

The housing 10 is provided with an opening or port 19 communicating the central chamber 11 with the fluid passage 13 and a valve seat member generally designated as 20 is adapted to be mounted in the opening 19. The valve seat member 20 comprises a cylindrical body 21 provided at its outer end with a flange 22 and the outer face of the flange 22 together with the outer end of the cylindrical member 21 are faced off so as to provide a flat valve seat 23. The housing 10 is provided with a recess or seat 24 within which the flange 22 is adapted to engage so that the valve seat 23 will be substantially flush with a shoulder 25 provided at the inner end of the boss 12. Preferably the cylindrical member 21 and the flange 22 are pressed into the opening 19 so as to firmly retain the combined valve seat and guide member 20 in the opening or port 19.

A valve member or head 26 is provided with a valve stem 27 and an enlarged portion 28 is provided at a point inwardly of the valve head 26 and about the stem 27. This enlarged portion 28 is provided with an axial opening or socket 29 the purpose of which will be hereinafter described.

A gasket or sealing member 30 formed of composition material engages against the inner face of the valve head 26 and is provided with a central opening 31 in which the enlarged socket member 28 is received. A clamping plate 32 engages against the inner face of the gasket 30 and has a diameter substantially smaller than the diameter of the gasket 30 so that the plate 32 will engage interiorly of the cylindrical body 21. The plate 32 is held in clamping position by means of a split holding ring 33 which engages in a groove 34 provided on the periphery of the socket member 28. In this manner when the gasket 30 becomes worn the plate 32 may be removed by expanding the ring 33 and removing the plate 32 so as to permit replacement of the gasket 30.

The cylindrical member 21 is provided with a pair of diametrically opposed extensions 35 and a connecting bar 36 extends diametrically across the body 21 and connects the two extensions 35 together. The connecting bar 36 also acts as a valve stem guide support and may be formed integral with the extensions 35 and the cylindrical member 21. A valve guiding boss 37 is carried by the supporting bar 36 and is provided with a central opening 38 in which the stem 27 slidably engages. As shown in the drawings the guiding boss 37 has its inner end flush with the inner face of the supporting bar 36 and extends outwardly for a distance substantially equal to the length of the two extensions 35.

The valve member 26 and the gasket 30 are held in a closed position by means of a spring 39 which at one end engages within the socket 29 and at the other end engages against a plate 40. The plate 40 is held centrally of the passage 39 by means of a plurality of radially disposed arms 41 and preferably the inner ends of the arms 41 are provided with outwardly offset portions 42 which form a spring seat 43 within which the outer end of the spring 39 engages. The arms 41 are provided at their outer ends with outwardly offset portions 44 which are adapted to engage a seat 45 formed by an inwardly projecting rib 46 which is formed integral with the boss 12. The spider or spring holding member comprising the plate 40 and the radial arms 41 is held on the seat 45 by means of a split holding ring 47 engaging in a groove 48 provided in the boss 12. In the present instance there are shown three bosses 12 and three valve members 26 so that the fuel supply for the engine may be received from a selected one of three different sources of fuel supply.

The housing 10 is provided in a side wall 49 thereof with an outlet port 50 and a bushing 51 engages in the port or opening 50 and is provided with a flange 52 which is adapted to be secured as by screws or bolts 54 to the wall 49. An outlet pipe 55 is adapted to be threaded into the bushing 51 and connected to the carburetor of an internal combustion engine. A gasket 56 is adapted to be interposed between the flange 52 and the outer face of the side wall 49 so as to seal the bushing 51 on the housing 10. The bushing 51 communicates with the central or common chamber 11 of the housing 10.

The valve members 26 are selectively held in an open position by means of a cam or valve operating member 57 which is secured as by a pin or fastening member 58 to a reduced portion 59 of a cam operating shaft 60. The shaft 60 is journaled through the opposite side wall 61 of the housing 10 and at its outer end is provided with a holder or coupling member 62 with which an operating handle of suitable construction is adapted to be engaged. The holder 62 is secured to the shaft 60 by means of a pin or fastening member 63.

The shaft 60 at its inner end is provided with a reduced portion 64 extending inwardly of the reduced portion 59 and this reduced portion or stud 64 is journaled in a bearing 65 carried by a U-shaped supporting member 66. The bearing supporting member 66 has the bearing 65 mounted in the center of the bight and the parallel legs of the support 66 are formed integral with an annulus 67 which tightly engages in the opening 60. The inner end of the boss 51 engages within the annulus 67.

The shaft 60 is sealed relative to the wall 61 of the housing 10 by means of a sealing gasket 68 which engages about the shaft 60 and is mounted in a recess 69 provided on the interior of the wall 61. A cup-shaped gasket compressing member 70 is provided with a cylindrical inner portion 71 and engages against the inner face of the gasket 68. The gasket holding member comprising the cup 70 and the bushing or cylindrical member 71 is held against inward movement on the shaft 60 by means of a split holding ring 72 engaging in a groove 73 provided in the shaft 60. A compression spring 74 is disposed about the shaft 60 and at one end engages against the inner face of the cup 70 and about the bushing 71. The inner end of the spring 74 engages against an index plate 75 loosely mounted on the shaft 60 and provided with radially disposed L-shaped arms 76. The spider comprising the plate 75 and the radial arms 76 is held against rotation relative to the housing 10 by means of a pair of pins 77 which are mounted in recesses 78 provided in the wall 61. A wear plate 79 is disposed about the shaft 60 between the outer face of the wall or bearing member 61 and the inner end of the coupling member 62 so that the spring 74 will not only hold the gasket 68 tightly against the inner face of the bearing 61, but will hold the yoke 62 against the wear plate 79.

In Figures 5 and 6 there is disclosed a slightly modified form of valve structure including a cylindrical body 21ᵃ which is adapted to be positioned in a port or opening similar to 19 and which is provided at its outer end with a flange 22ᵃ and a valve seat 23ᵃ. A valve head 26ᵃ similar to the valve head 26 has a gasket 30ᵃ secured to the inner face thereof by means of a clamping plate 32ᵃ which is held in clamping position by means of a split clamping ring 33ᵃ engaging in a groove 34ᵃ provided in a socket member 28ᵃ. The valve head 26ᵃ has a valve stem 27ᵃ which slidably engages through a boss or bushing 37ª which is carried by a diametrically disposed supporting member 36ª. In the present instance the supporting member 36ª is disposed in edgewise relation whereas the supporting bar 36 is disposed in an opposite direction with the flat sides thereof confronting the opposite ends of the cylindrical member 21. With a construction as shown in Figures 5 and 6 the supporting member 26 for the valve stem guide 37ª will present a substantially streamlined construction which will not unduly obstruct the flow of fluid through the cylindrical member 21ª. In addition by disposing the supporting member 36ª in edgewise relation this supporting member will more firmly brace the guide 26ª.

The valve stem 27 at its inner end is provided with a rounded cam engaging portion 80 and the peak or high point of the cam 57 is provided with a substantially flat valve stem engaging portion 81.

In the use and operation of this valve structure the cam 57 is rotated by means of a suitable handle which may be connected to the coupling member 62. When the shaft 60 is rotated to the desired position the cam 57 will push the selected valve stem outwardly so as to raise the valve head 26 and the gasket 30 off of the selected valve seat 23. This will permit communication between the selected supply pipe 15 and the common fluid chamber 11. The fluid entering the chamber 11 will pass freely out through the outlet port 50 and the outlet 55.

With a structure of this kind when one or more of the valves are found to leak the valves may be removed by releasing the spider comprising the plate 40 and the arms 41. This is done by withdrawing the split ring 47 so as to permit the spider to be withdrawn. The selected valve or valves may then be pulled outwardly through the selected boss 12. The gasket 30 on the worn valve head 26 may be replaced by expanding the split ring 33 and releasing the clamping plate 32. A new gasket 30 may then be placed against the inner face of the valve head 26 and clamped as hereinbefore described.

The index plate 75 is provided with radial V-shaped detents 82 which are adapted to engage radial V-shaped recesses 83 formed in a face of the cam 57 so that when a detent 82 is engaged in a selected recess 83 the cam 57 will be yieldably held in a valve opening position. The detent 82 may be so arranged and of such number that in one position of the cam 57 relative to the index plate 75 the cam 57 will be held in a valve closing position.

In Figure 8 there is disclosed a modified form of valve operating cam 57ª. The cam 57ª includes a flat body part of substantially egg-shaped contour having a circular offset on one side. The diameter of the offset is less than the length of said body part. A portion of the edge of the offset is flush with the edge of the smaller end of the body part. The latter extends from the remaining portion of the edge of the offset. The cam is formed with an opening disposed eccentrically thereof, but such opening is arranged axially of said circular offset. The latter is formed on its exposed face with radially disposed V-shaped recesses 83ª, which extend from the wall of the aforesaid opening to the edge of the offset. The cam 57ª is secured to the shaft 60 in the same manner as the cam 57. The detents 82 of the index plate 75 are adapted to selectively engage in the recesses 83ª. The cam 57ª is so constructed that during the rotation thereof one valve 26 will be in partly opened position while a succeeding valve 26 is beginning to open. In this manner there will not at any time be a complete cut-off of one source of supply before a succeeding supply source is placed in communication with the common chamber 11. This will assure a continuous supply of fuel to the chamber 11 irrespective of how fast the cam 57ª is rotated and irrespective of whether the cam 57ª should be accidentally turned to a position between a pair of valve stems 27.

A valve structure or assembly of this character will eliminate static losses which are now present in valve structures of this kind due to the fact that the fluid from the supply source is subjected to a minimum of intersecting elements through the valve assembly. It will, therefore, be appreciated that where the fluid supply moves under gravity the movement or flow of the fluid will not be unduly retarded by the structural elements comprising this valve assembly.

What I claim is:

A valve assembly comprising a housing forming a fluid receiving chamber having a side and a pair of end walls, radially disposed bosses integral with the housing providing spaced inlet ports opening into said chamber through said side walls, said chamber being formed with an outlet at one end wall thereof, a U-shaped supporting member secured to said end wall and having its bight arranged within said chamber and spaced inwardly from said outlet, a spring controlled slidably mounted valve in each inlet port normally closing the latter and having a stem projecting into said chamber, a rotatable non-slidable shaft extending into said chamber, rotatably supported at its inner end by said bight and rotatably supported intermediate its ends by the other end wall of said chamber, a cam fixedly secured to said shaft in proximity to said bight for successively shifting said stems to selectively open said valves and being so formed to provide that upon the travel thereof from one stem to a succeeding stem the valve with which said one stem is correlated will be in partly open position during the initial opening of that valve with which the succeeding stem is correlated, said cam having a circular offset on one side thereof formed with radially disposed V-shaped recesses, a sealing means about said shaft bearing against the inner face of the said other end wall, said shaft being formed intermediate its ends with an endless peripheral groove, a split retaining ring mounted in said groove for said means, an axially apertured circular index plate on said shaft, bearing against said offset and formed with diametrically opposed detents for correlation with said recesses to latch said cam in valve opening position, a pressure urging spring common to said means and plate encompassing said shaft and ring, said plate being formed at its outer edge with diametrically opposed radial disposed apertured arms, and pins projecting from the inner face of the said other end wall and engaging in said arms to prevent the revolving of the index plate relative to the shaft.

GEORGE T. DOWNEY.